Figure 1:
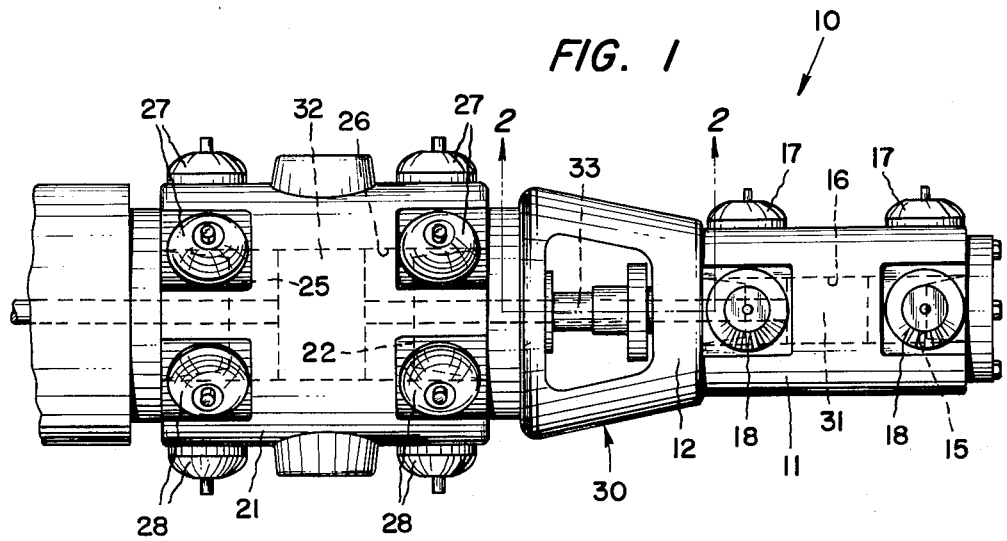

Feb. 8, 1966 A. S. JOHNSON 3,233,824
MULTI-STAGE SEAL ASSEMBLY
Filed March 27, 1964

INVENTOR.
ARTHUR S. JOHNSON
BY Charles J. Worth
AGENT

United States Patent Office 3,233,824
Patented Feb. 8, 1966

3,233,824
MULTI-STAGE SEAL ASSEMBLY
Arthur S. Johnson, Painted Post, N.Y., assignor to Ingersoll-Rand Company, New York, N.Y., a corporation of New Jersey
Filed Mar. 27, 1964, Ser. No. 355,213
18 Claims. (Cl. 230—185)

The present invention relates generally to seal means and more particularly to such means to prevent leakage along a movable rod or shaft member which passes through a pair of fixedly spaced pressure fluid retaining walls.

At the present time, arrangements incorporating a rotatable or axially movable rod or shaft which extends through a pair of fixedly spaced walls, each separating high and low pressure areas from one another and together defining a common pressure area, are provided with a separate running type seal between each wall and the movable member. The term running seal is used in its generic sense to define a seal between two members which have relative movement either linear, rotary, or a combination thereof.

It is well known that in use of a running type seal, a compromise normally is required. More specifically, where sufficient sealing force is provided for absolute sealing by a running type seal when new or after wear, excessive friction normally is encountered. Conversely, when such derived friction is maintained at a minimum, the sealing force is insufficient for absolute sealing.

The present invention is equally adapted to arrangements requiring sealing for a shaft or rod member which is rotatable or is movable linearly. Notwithstanding, the present invention is shown and described in one of its preferred embodiments which is a reciprocating type compressor having a pair of pistons and cylinders arranged in tandem.

In view of the foregoing, an object of the present invention is to provide a seal assembly between a single member which extends through and is movable relative to a pair of wall members each of which separate high and low pressure areas from one another to prevent leakage between the single member and each of the wall members.

Another object of the present invention is to provide the foregoing seal assembly having a running type seal between each wall member and the single member.

Still another object of the present invention is to provide the foregoing seal assembly having a pressure balance chamber that is common to and is disposed on the low pressure side of the running seals.

The present invention contemplates a seal assembly for a device having a pair of fixedly spaced pressure retaining walls each having an opening therethrough axially alined with the opening of the other wall, and a movable shaft extending through the axially alined openings of the walls, comprising a tubular telescopic means encircling the shaft and being fixedly connected at its ends to the spaced walls to define a sealed chamber; and a pair of annular means encircling the shaft each engaging one of the walls and the end of the telescopic means connected thereto providing running type seals for the shaft at the ends of the chamber.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

Figure 2:
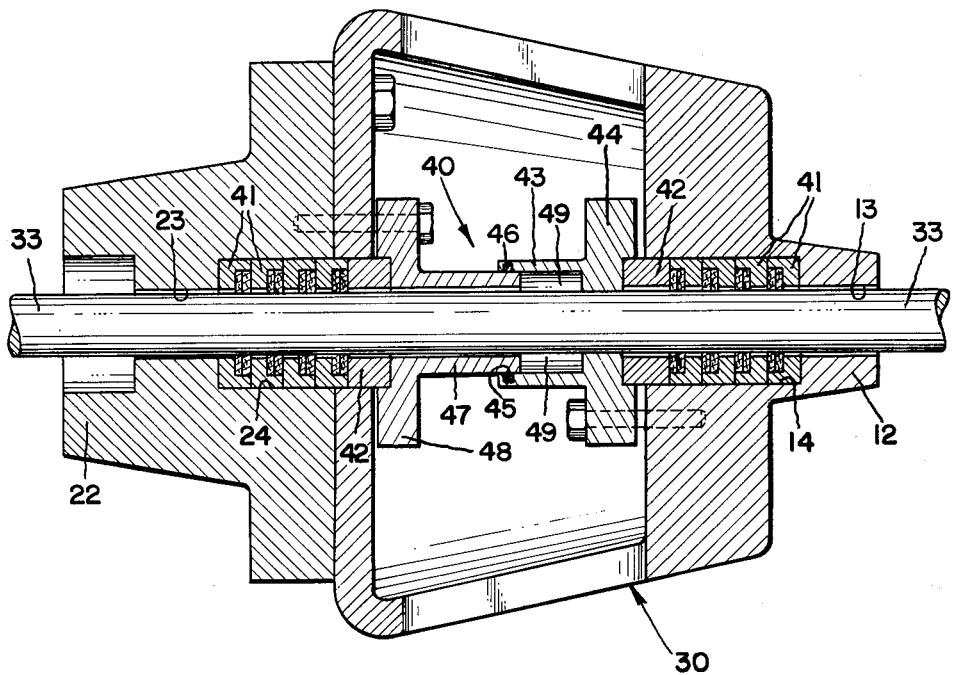

FIG. 1 is an elevational view of a portion of a reciprocating compressor made in accordance with the present invention, and FIG. 2 is an enlarged sectional view taken on line 2—2 of FIG. 1.

Referring now to the drawings a reciprocating compressor has a housing 10 (shown in part) comprised of a pair of axially spaced and alined cylinder casings 11 and 21 connected to each other by a spacer casing or distance piece 30.

Cylinder casing 11 is substantially tubular and has a pair of end walls 12 and 15 connected thereto by any conventional means for closing the ends of its bore to define a cylinder chamber 16. An inlet valve 17 and an outlet valve 18 is provided at each end of casing 11.

Similarly, cylinder casing 21 is substantially tubular and has a pair of end walls 22 and 25 connected thereto by any conventional means for closing the ends of its bore to define a cylinder chamber 26. An inlet valve 27 and an outlet valve 28 is provided at each end of casing 21.

A distance piece 30 is connected at one end to cylinder casing 11 and at its other end to cylinder casing 21 to connect casings 11 and 21 to one another in axially spaced and alined relationship. The cylinder end walls 12 and 22 disposed at the ends of the ends of casings 11 and 21 connected to distance piece 30 may be provided by an end cap or as an integral part of the distance piece. Toward this end, end wall 12 is illustrated as being an integral portion of distance piece 30, and end wall 22 is illustrated as an end cap or plate.

End walls 12 and 22 have through bores 13 and 23, respectively, for a cylinder rod 33 that extends through casing 21 and distance piece 30, and into casing 11. Bores 13 and 23 are axially alined with each other and cylinder chambers 16 and 26. Pistons or piston heads 31 and 32 are slidably disposed in cylinder chambers 16 and 26, respectively, and are connected to rod 33. Thus, pistons 31 and 32 are reciprocated in unison by rod 33 as it is reciprocally driven.

A novel seal assembly 40, shown in detail in FIG. 2, is provided to prevent leakage through end walls 12 and 22 along piston rod 33. Toward this end, the outer end of bore 13 is counterbored as at 14 while the outer end of bore 23 is similarly counterbored as at 24.

Ring type packing or sealing members 41 encircling shaft 33 are provided in each of the counterbores 14 and 24 together with a pair of backing rings 42 which also encircle shaft 33. The plurality of seal or packing members rings 41 together with a single backing ring 42 provided at each end of seal assembly 40 are for illustration and description purposes, only and are not to be construed as defining the limits of the present invention. The actual number, cross-sectional configuration, and/or character of material of ring type members 41 and 42 would be dictated by the specific compressor in which the novel seal assembly 40 is installed, and the operating conditions encountered.

A pair of tubular seal locking or retaining members 43 and 47 encircle rod 33 and are telescopically arranged relative to one another. One end retainer 43 abuts backing ring 42 disposed at least in part in counterbore 14 and has an outwardly extending flange 44 that is bolted or otherwise connected to end wall 12. Similarly, one end of retainer 47 abuts backing ring 42 disposed at least in part in counterbore 24 and has an outwardly extending flange 48 that is bolted or otherwise connected to end wall 22. The other ends of retainers 43 and 47 opposite from flanges 44 and 48, respectively, overlap and slidingly engage one another. The overlapping end of one of the retainers 43 or 47, in this instance retainer 43, has an annular groove 45 in which is housed an O-ring seal 46 to prevent leakage through the overlap. Thus, retainers 43 and 47 define a sealed annular pressure chamber 49 around rod 33 between walls 12 and 22 that is sealed at its ends by engagement of rings 42 by flanged ends 44 and 48 of the retainers 43 and 47, respectively.

Heretofore, arrangements of this type utilized two independent seal assemblies of the running type which are subject to leakage. It should be readily understood that with the present novel seal assembly 40, a pressure balance across each running seal is attained by the common pressure chamber 49, and final leakage prevented by a sealed connection having no parts movable relative to another.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. In a device having a pair of fixedly space pressure fluid retaining walls each having an opening therethrough axially alined with the opening of the other wall, and a movable shaft extending through the axially alined openings of the walls; a seal assmbly comprising:
   (a) a pair of tubular members encircling the shaft each having one end connected to one of the walls and its other end overlapping the other end of the other tubular member for free telescoping movement and to define a sealed chamber between the spaced walls;
   (b) annular seal means disposed between the overlapping ends of the tubular members to prevent leakage of pressure fluid therebetween while allowing free telescoping movement between said tubular members, and
   (c) a pair of annular means encircling the shaft, each engaging one of the walls and the end of the tubular member connected thereto providing running type seals for the shaft at the ends of the chamber.

2. In a device having a pair of fixedly spaced pressure fluid retaining walls each having an opening therethrough axially alined with the opening of the other wall, and a movable shaft extending through the axially alined openings of the walls; a seal assembly comprising:
   (a) a pair of tubular members encircling the shaft each having one end connected to one of the walls and its other end overlapping the other end of the other tubular member for free telescoping movement and to define a sealed chamber between the spaced walls;
   (b) annular seal means disposed between the overlapping ends of the tubular members to prevent leakage of pressure fluid therebetween while allowing free telescoping movement between said tubular members; and
   (c) a pair of annular means encircling the shaft, each being disposed in the opening of one of the walls and engaging the end of the tubular member connected thereto providing running type seals for the shaft at the ends of the chamber.

3. In a device having a pair of fixedly spaced pressure fluid retaining walls each having an opening therethrough axially alined with the opening of the other wall, and a movable shaft extending through the axially alined openings of the walls; a seal assembly comprising:
   (a) a pair of tubular members encircling the shaft each having one end connected to one of the walls and its other end overlapping the other end of the other tubular member for free telescoping movement and to define a sealed chamber between the spaced walls;
   (b) annular seal means disposed between the over lapping ends of the tubular members to prevent leakage of pressure fluid therebetween while allowing free telescoping movement between said tubular members;
   (c) a pair of annular means encircling the shaft, each being disposed in the opening of one of the walls and providing running type seals for the shaft at the ends of the chamber; and
   (d) the connected ends of the tubular members engaging the pair of annular means to retain such means in the openings and to prevent leakage of pressure fluid at the ends of the chamber between the walls and the ends of the tubular members connected thereto.

4. In a compressor:
   (a) a pair of axially alined cylinders disposed in spaced end to end relationship;
   (b) means disposed between the cylinders and connected to the spaced cylinder ends retaining the cylinders in such spaced axial alinement;
   (c) each of the cylinders having a wall at its end spaced from the end of the other cylinder;
   (d) each of the end walls having an opening therethrough axially alined with the opening of the other end wall and with the cylinders;
   (e) a reciprocal rod extending through the openings of the end walls;
   (f) a pair of pistons each slidably disposed in one of the cylinders and connected to the rod to be reciprocated in unison with the other piston;
   (g) a tubular telescopic means encircling the rod and being connected at its ends to the end walls defining a sealed chamber between the cylinders; and
   (h) a pair of annular means encircling the rod each engaging one of the end walls and the end of the telescopic means connected thereto providing running type seals for the ends of the chamber.

5. In a compressor according to claim 4, and
   (a) at least one of the end walls being integral with the spacing means.

6. In a compressor according to claim 4, and
   (a) at least one of the end walls being connected to one of the cylinders and to the spacing means to connect the spacing means to the cylinder.

7. In a compressor:
   (a) a pair of axially alined cylinders disposed in spaced end to end relationship;
   (b) means disposed between the cylinders and connected to the spaced cylinder ends retaining the cylinders in such spaced axial alinement;
   (c) each of the cylinders having a wall at its end spaced from the end of the other cylinder;
   (d) each of the end walls having an opening therethrough axially alined with the opening of the other end wall and with the cylinders;
   (e) a reciprocal rod extending through the openings of the end walls;
   (f) a pair of pistons each slidably disposed in one of the cylinders and connected to the rod to be reciprocated in unison with the other piston;
   (g) a tubular telescopic means encircling the rod and being connected at its ends to the end walls defining a sealed chamber between the cylinders; and
   (h) a pair of annular means encircling the rod each being disposed in the opening of one of the end walls and engaging the end of the telescopic means connected thereto providing running type seals for the rod at the ends of the chamber.

8. In a compressor according to claim 7, and:
   (a) at least one of the end walls being integral with the spacing means.

9. In a compressor according to claim 7, and:
   (a) at least one of the end walls being connected to one of the cylinders and to the spacing means to connect the spacing means to the cylinder.

10. In a compressor:
    (a) a pair of axially alined cylinders disposed in spaced end to end relationship;
    (b) means disposed between the cylinders and connected to the spaced cylinders ends retaining the cylinders in such spaced axial alinement;
(c) each of the cylinders having a wall at its end spaced from the end of the other cylinder;
(d) each of the end walls having an opening therethrough axially alined with the opening of the other end wall and with the cylinders;
(e) a reciprocal rod extending through the openings of the end walls;
(f) a pair of pistons each slidably disposed in one of the cylinders and connected to the rod to be reciprocated in unison with the other piston;
(g) a pair of tubular members encircling the rod each having one end connected to one of the end walls and its other end overlapping the other end of the other tubular member to define a sealed chamber between the cylinders;
(h) annular seal means disposed between the overlapping ends of the tubular members to prevent leakage therebetween; and
(i) a pair of annular means encircling the rod each engaging one of the walls and the end of the tubular member connected thereto providing running type seals for the shaft at the ends of the chamber.

11. In a compressor according to claim 10, and:
(a) at least one of the end walls being integral with the spacing means.

12. In a compressor according to claim 10, and:
(a) at least one of the end walls being connected to one of the cylinders and to the spacing means to connect the spacing means to the cylinder.

13. In a compressor:
(a) a pair of axially alined cylinders disposed in spaced end to end relationship;
(b) means disposed between the cylinders and connected to the spaced cylinder ends retaining the cylinders in such spaced axial alinement;
(c) each of the cylinders having a wall at its end spaced from the end of the other cylinder;
(d) each of the end walls having an opening therethrough axially alined with the opening of the other end wall and with the cylinders;
(e) a reciprocal rod extending through the openings of the end walls;
(f) a pair of pistons each slidably disposed in one of the cylinders and connected to the rod to be reciprocated in unison with the other piston;
(g) a pair of tubular members encircling the rod each having one end connected to one of the end walls and its other and overlapping the other end of the other tubular member to define a sealed chamber between the cylinders;
(h) annular seal means disposed between the overlapping ends of the tubular members to prevent leakage therebetween, and
(i) a pair of annular means encircling the rod each being disposed in the opening of one of the end walls and engaging the end of the tubular member connected thereto providing running type seals for the shaft at the ends of the chamber.

14. In a compressor according to claim 13, and:
(a) at least one of the end walls being integral with the spacing means.

15. In a compressor according to claim 13, and:
(a) at least one of the end walls being connected to one of the cylinders and to the spacing means to connect the spacing means to the cylinder.

16. In a compressor:
(a) a pair of axially alined cylinders disposed in spaced end to end relationship;
(b) means disposed between the cylinders and connected to the spaced cylinder ends retaining the cylinders in such spaced axial alinement;
(c) each of the cylinders having a wall at its end spaced from the end of the other cylinder;
(d) each of the end walls having an opening therethrough axially alined with the opening of the other end wall and with the cylinders;
(e) a reciprocal rod extending through the openings of the end walls;
(f) a pair of pistons each slidably disposed in one of the cylinders and connected to the rod to be reciprocated in unison with the other piston;
(g) a pair of tubular members encircling the rod each having one end connected to one of the end walls and its other end overlapping the other end of the other tubular member to define a sealed chamber between the cylinders;
(h) annular seal means disposed between the overlapping ends of the tubular members to prevent leakage therebetween;
(i) a pair of annular means encircling the rod each being disposed in the opening of one of the walls and providing running type seals for the rod at the ends of the chamber; and
(j) the connected ends of the tubular members engaging the pair of annular means to retain such means in the openings and to prevent leakage at the ends of the chamber between the walls and the ends of the tubular members connected thereto.

17. In a compressor according to claim 16, and:
(a) at least one of the end walls being integral with the spacing means.

18. In a compressor according to claim 16, and:
(a) at least one of the end walls being connected to one of the cylinders and to the spacing means to connect the spacing means to the cylinder.

References Cited by the Examiner
UNITED STATES PATENTS
2,217,686  10/1940  Kreher _____ 277—64

MARK NEWMAN, *Primary Examiner.*
WARREN E. COLEMAN, *Examiner.*